No. 783,788. PATENTED FEB. 28, 1905.
O. J. JOHNSON.
MACHINE FOR MAKING CAN BODIES.
APPLICATION FILED NOV. 28, 1902.
4 SHEETS—SHEET 1.
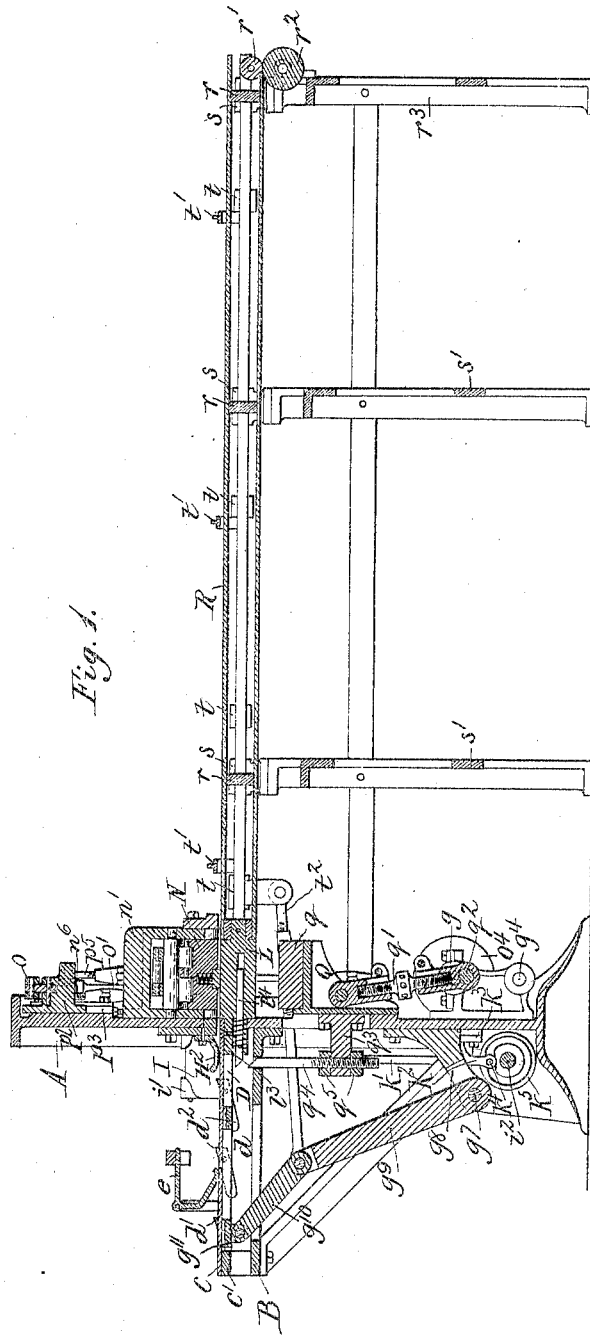
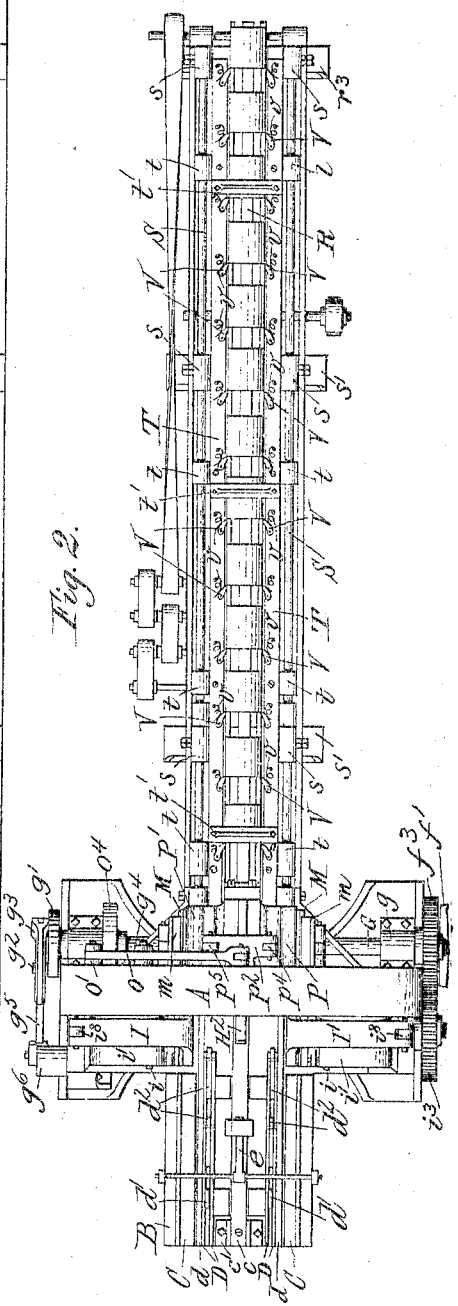

No. 783,788. PATENTED FEB. 28, 1905.
O. J. JOHNSON.
MACHINE FOR MAKING CAN BODIES.
APPLICATION FILED NOV. 28, 1902.
4 SHEETS—SHEET 2.
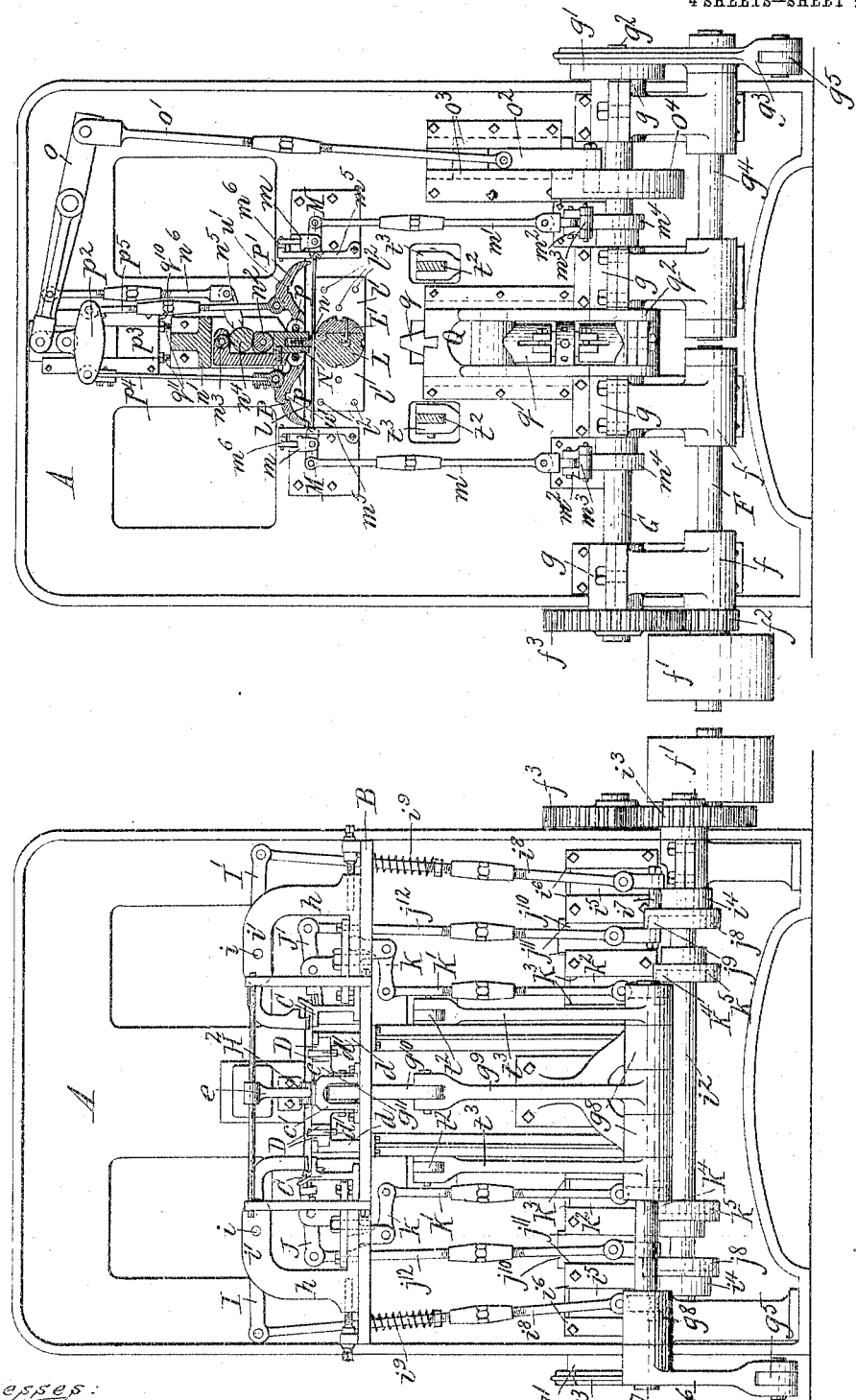

No. 783,788. PATENTED FEB. 28, 1905.
O. J. JOHNSON.
MACHINE FOR MAKING CAN BODIES.
APPLICATION FILED NOV. 28, 1902.
4 SHEETS—SHEET 3.
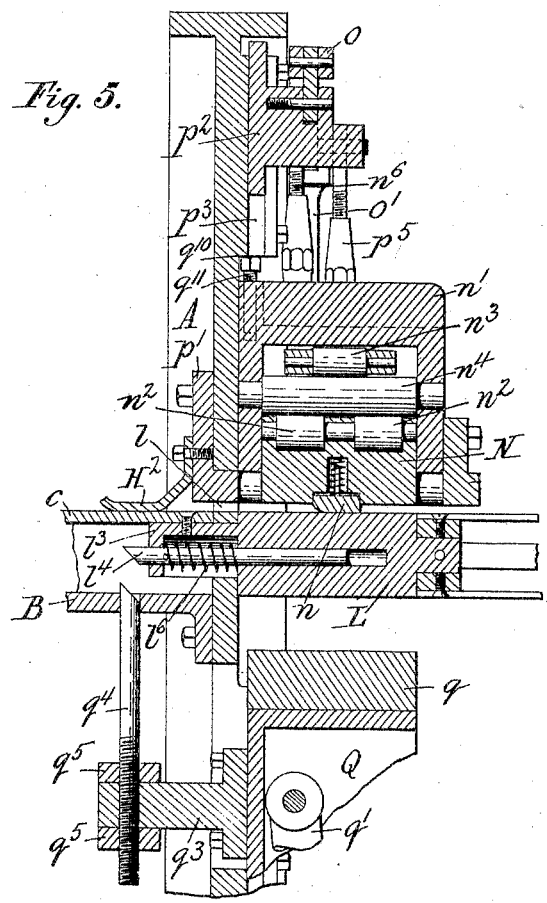
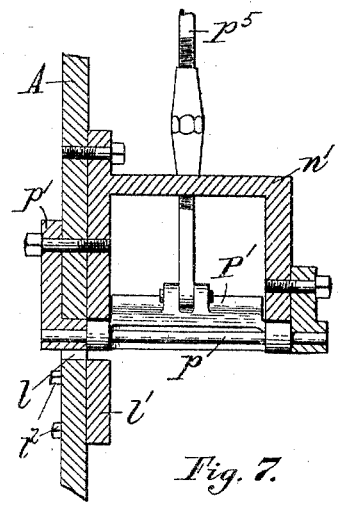
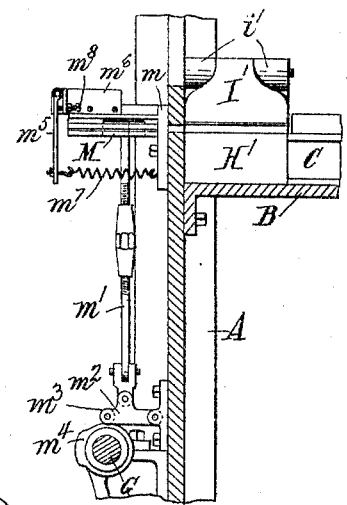
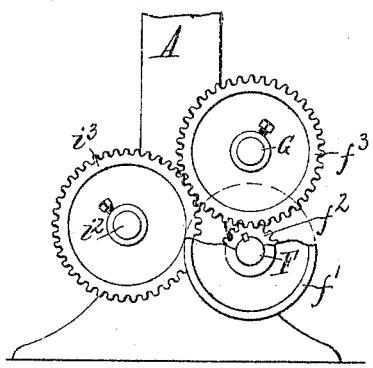
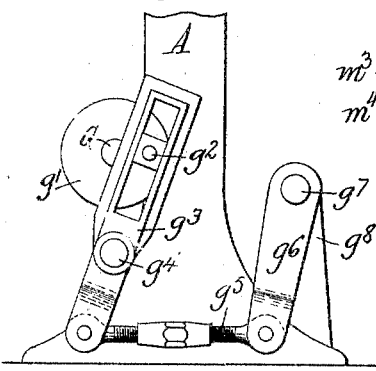
Witnesses:
Albert F. Thauer
E. A. Volk
Oliver J. Johnson Inventor.
By Wilhelm Bonner
Attorneys.

No. 783,788. PATENTED FEB. 28, 1905.
O. J. JOHNSON.
MACHINE FOR MAKING CAN BODIES.
APPLICATION FILED NOV. 28, 1902.
4 SHEETS—SHEET 4.
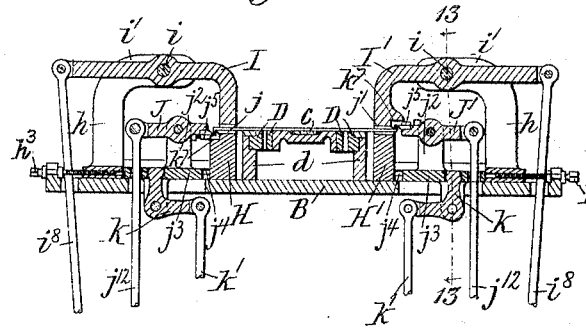
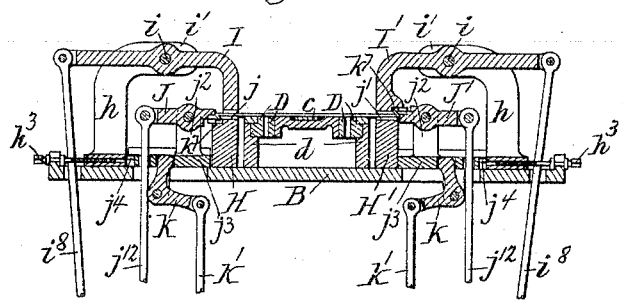
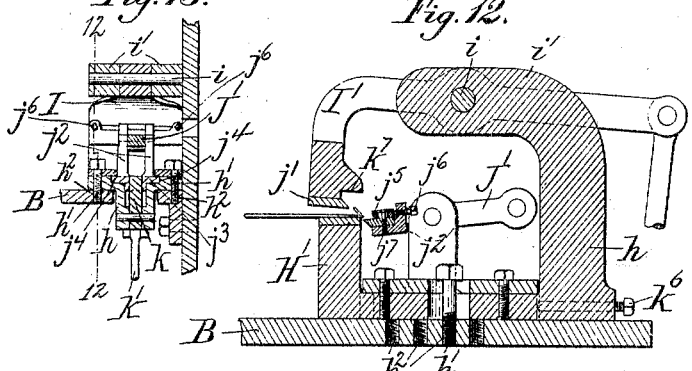
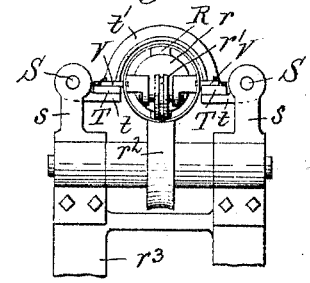
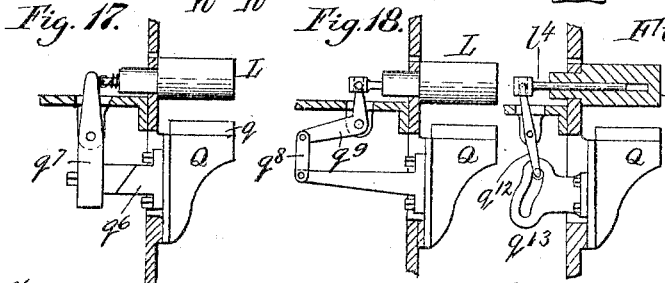
Witnesses:
Albert F. Kranz
E. A. Volk
Oliver J. Johnson, Inventor.
By Wilhelm & Bonner, Attorneys.

No. 783,788.

Patented February 28, 1905.

UNITED STATES PATENT OFFICE.

OLIVER J. JOHNSON, OF WHEELING, WEST VIRGINIA.

MACHINE FOR MAKING CAN-BODIES.

SPECIFICATION forming part of Letters Patent No. 783,788, dated February 28, 1905.

Application filed November 28, 1902. Serial No. 133,031.

*To all whom it may concern:*

Be it known that I, OLIVER J. JOHNSON, a citizen of the United States, residing at Wheeling, in the county of Ohio and State of West Virginia, have invented new and useful Improvements in Machines for Making Can-Bodies, of which the following is a specification.

This invention relates to a can-body-making machine of that type in which the flat sheet-metal blanks for the can-bodies are delivered one by one by an operator to a feed mechanism which carries the blanks successively to an edging mechanism in which the opposite side edges of the blanks are bent to form oppositely-projecting seam-hooks, after which the hooked blanks are fed to the body-forming mechanism, which forms the blank around a forming horn or mandrel, interlocks the hooks, and presses the seam, and are then conveyed successively to the fluxing, soldering, burnishing, and solder-cooling devices.

The object of the invention is to produce a rapid efficient machine which is of simple, inexpensive, strong, and durable construction.

Another object of the invention is to improve machines of this type in certain particulars, which will appear from the following description.

In the accompanying drawings, consisting of four sheets, Figure 1 is a central vertical longitudinal section through a can-body-making machine embodying the invention. Fig. 2 is a plan view thereof. Fig. 3 is a front elevation thereof on an enlarged scale. Fig. 4 is a transverse vertical sectional elevation thereof on an enlarged scale. Fig. 5 is an enlarged fragmentary longitudinal section showing the body-forming mechanism. Fig. 6 is an enlarged sectional elevation showing the manner of mounting the body-forming jaws. Fig. 7 is an enlarged sectional elevation showing the pivoted side support for the body-blank. Figs. 8 and 9 are enlarged fragmentary views showing opposite sides of the lower portion of the machine. Fig. 10 is an enlarged transverse section through the edging mechanism, showing the first step in the operation of forming the seam-hooks. Fig. 11 is a similar view showing the second step of the operation. Fig. 12 is an enlarged transverse section of one-half of the edging mechanism, showing the position of the parts after the hook is formed and the blank released. Fig. 13 is a section through the edging mechanism in line 13 13, Fig. 10. Fig. 14 is an enlarged fragmentary horizontal section through the forming-horn and body-conveying mechanism. Fig. 15 is a section in line 15 15, Fig. 14. Fig. 16 is an enlarged rear end elevation of the horn extension. Figs. 17, 18, and 19 are sectional elevations showing different forms of the operating mechanism for the horn-expanding pin.

Like letters of reference refer to like parts in the several figures.

A represents an upright main supporting frame or standard, and B represents a horizontal frame extension which projects forwardly from the main frame. The frame may be of any suitable form and construction. The horizontal frame extension forms a support for the feed mechanism for the can-body blanks.

C C represent side horizontal flanged rails which are supported by the frame extension, and $c$ is a central horizontal rail or strip which is supported at its forward end by a bracket $c'$ and at its rear end by the forming-horn, as hereinafter explained. The flat can-body blanks are successively placed on these rails, which constitute a support for the blanks, by the operator.

D represents horizontal reciprocating feed-bars which are arranged in pairs between the stationary side and center supporting-rails and are mounted to slide back and forth in ways $d$, rising from the frame extension.

$e$ represents a bent weighted lever which is pivoted on standards rising from the frame extension and is provided with a depending arm adapted to bear on the upper faces of the body-blanks to hold the latter down on the supporting-rails.

Each pair of the reciprocating feed-rods is provided with a front upwardly-projecting tooth $d'$ and pivoted feed-fingers $d^2$. The latter are arranged between the bars of each pair and are weighted, so that their rear ends are normally held slightly above the upper faces of the feed-bars and supporting-rails to engage the body-blanks. The blank is placed in the rear of the stationary feed-tooth beneath the depending arm of the weighted lever $e$, and when the bars are moved rearwardly it is carried one step rearwardly toward the edging mechanism. When the feed-bars are returned forwardly, the upper inclined faces of the front pair of pivoted feed-fingers are engaged by the blank and the fingers yield and pass beneath the blank. When they clear the blank, their front ends are thrown up and engage the front edge of the blank, which at the next rearward movement of the feed-bars is carried to the edging mechanism.

The feed-bars are reciprocated by suitable mechanism, that shown in the drawings, Figs. 1 to 4, 8 and 9, being constructed as follows: F represents a horizontal main drive-shaft which is journaled in suitable bearings $f$ at the lower portion of the rear side of the main frame. The drive-shaft is provided with suitable drive-pulleys $f'$ and with a gear-pinion $f^2$, which meshes with and drives a gear-wheel $f^3$, secured to one end of a horizontal crank-shaft G, journaled on the rear side of the main frame above and parallel with the drive-shaft in bearings $g$. The crank-shaft is provided at its opposite end with a crank-disk $g'$, the crank-pin $g^2$ of which extends into a block sliding in an elongated slot in the upper arm of a lever $g^3$, which is secured to the outer end of a rock-shaft $g^4$, journaled in bearings on the rear side of the main frame. The lower end of the lever $g^3$ is connected by a link $g^5$ to a rock-arm $g^6$, secured to a rock-shaft $g^7$, which is journaled in suitable bearings $g^8$ on the front side of the main frame. The rock-shaft $g^7$ is provided with an upwardly-extending arm or lever $g^9$, which is connected by a link $g^{10}$ to a cross-head $g^{11}$, connecting the opposite pairs of feed-bars, which through this mechanism are reciprocated back and forth to feed the blanks to the edging mechanism.

The edging mechanism, or mechanism for bending the opposite edges of the body-blank to form the seam-hooks, is supported on the frame extension in front of the main frame and is constructed as follows, (see Figs. 1 to 3, 10 to 13:) $h$ represents oppositely-arranged brackets which rest on the horizontal frame extension, to which they are secured by bolts $h'$, Figs. 12 and 13, which pass through slots in the bases of the brackets and engage in threaded holes $h^2$ in the frame extension. There are a series of bolt-holes $h^2$ for each bolt, which enable the brackets to be secured nearer to or farther from each other. $h^3$, Figs. 3 and 11, represents adjusting-screws which are journaled in lugs on the frame extension and engage in threaded holes in the brackets. When the bolts $h'$ are loosened, the brackets can be adjusted accurately by the adjusting-screws, after which they are firmly held by tightening the bolts $h'$. The brackets can thus be set in the proper relation to accommodate blanks for can-bodies of different diameters.

H H' represent two blank supports or rests which may be secured to or formed internally on and rise from the inner ends of the brackets $h$, having their upper faces on the horizontal plane of and in rear of the side supporting-rails C C for the blanks.

$H^2$ represents a spring-finger which projects forwardly from the main frame and is adapted to bear on the central portion of the blank. This finger is adapted to bear on the body-blanks when they are fed to the edging mechanism and prevent the blanks from being thrown past the edging mechanism by reason of the impact of the feed-fingers with the blank. The finger also prevents the blank from buckling while the seam-hooks are being formed.

The blank is firmly held on the supports H H' while the hooks are formed on its opposite edges by gripper-levers I I'. These levers are oppositely arranged, and each is provided with a downwardly-extending inner end arranged over and adapted to bear on the blank and press the latter firmly on top of the supports H H'. The gripper-levers are pivoted near their inner ends on pins $i$ in bearings $i'$, which rise from the adjustable brackets $h$. The gripper-levers are rocked on their pivots to grip and release the body-blank by suitable mechanism, which, as shown in the drawings, is constructed as follows: $i^2$, Fig. 3, represents a horizontal cam-shaft which is journaled in suitable bearings on the lower portion of the front side of the main frame. The cam-shaft is provided at one end with a gear-wheel $i^3$, which meshes with and is driven by the gear-wheel $f^3$ on the crank-shaft. The cam-shaft is provided near opposite ends with cams $i^4$. $i^5$ represents slides which are mounted to reciprocate in suitable vertical ways $i^6$ on the front of the main frame and are provided with rollers $i^7$, which bear on the peripheries of the operating-cams $i^4$ for the gripper-levers. The slides are connected by links $i^8$ to the outer ends of the gripper-levers. Springs $i^9$ surround the links between shoulders thereon and a stationary part of the machine, such as the frame extension. When the slides are reciprocated by the operating cams and springs, the links are raised and lowered, thus rocking the gripper-levers. The connecting-links $i^8$ are preferably made adjustable in length to regulate the movement of the gripper-levers by ordinary turnbuckles.

In forming the seam-hooks one edge of the blank is bent upwardly and the other downwardly. The stationary support H for the blank is provided with a lip $j$, having a beveled under face, over which the adjacent edge of the blank is bent downwardly, and the gripper-lever I' for the opposite side of the blank is provided with a lip $j''$, having a beveled upper face, over which the other edge of the blank is bent upwardly. The edges of the blank are bent one up and the other down by hook-forming levers J J', which are arranged outside of the blank-supports H H' beneath the gripper-levers. The hook-forming levers are fulcrumed intermediate of their ends on pins mounted in bearing-lugs $j^2$, which rise from slides $j^3$, which are mounted to reciprocate toward and from the blank in ways $j^4$, of any suitable construction, provided therefor in the adjustable brackets $h$. The hook-forming lever J is provided at its inner end with an elongated flange or lip having a beveled upper face, and the lever J' is provided with a similar lip having a beveled lower face. Each hook-forming lever also carries a gage-strip $j^5$, against which the opposite edges of the blank are adapted to engage to center the blank properly on the supports H H'. The gage-strips (see Figs. 10 and 12) are movably mounted on the inner ends of the forming-levers, and adjusting-screws $j^6$ are provided, which bear against the outer edges of the gage-strips for setting the latter nearer to or farther from the blank. The gage-strips are firmly secured when set by clamping-bolts $j^7$, which pass through slots in the gage-strips and are screwed into threaded holes in the forming-levers. The gage-strip for the lever J is arranged on the under side of the same below its hook-forming lip, while the gage-strip for the other lever is arranged on its upper side above its hook-forming lip. In the initial position of the hook-forming levers the lever J has its inner end inclined upwardly and the lever J' has its inner end inclined downwardly to bring the gage-strips on the horizontal plane of the blank on the supports H H'. The hook-forming levers are then rocked oppositely to cause their forming-lips to engage the opposite ends of the blank and bend one up and the other down, as indicated in Fig. 10. The means shown in the drawings, Fig. 3, for rocking the levers consists of cams $j^8$, secured to the cam-shaft $i^2$ and provided with cam-grooves in which travel rollers or studs $j^9$, secured on slides $j^{10}$, which are mounted to reciprocate in vertical ways $j^{11}$ on the main frame or standard and are connected by links $j^{12}$ to the outer ends of the hook-forming levers. The links $j^{12}$ are preferably made adjustable to regulate the throw of the levers by ordinary turnbuckles. After the levers have been swung to the position indicated in Fig. 10 the hook-forming levers are moved bodily inward or toward the blank to bend the hooked edges of the blank firmly over against the beveled faces of the lips on the support H and gripper-lever I'. The hook-forming levers are moved inwardly by bell-crank levers $k$, which are fulcrumed on lugs depending from the brackets $h$ through slots in the frame extension. One arm of each bell-crank lever projects up and engages in an opening in the base of the slide carrying the hook-forming lever. The bell-crank levers are connected by links $k'$ to slides $k^2$, which are mounted to reciprocate in vertical ways $k^3$ on the main frame. The slides $k^2$ are provided with studs or rollers $k^4$, which engage in cam-grooves in cam-disks $k^5$, secured to the cam-shaft $i^2$. The outward movement of the lever-slides is limited by adjustable stop-screws $k^6$, Fig. 12. When the hook-forming levers are moved toward each other, the seam-hooks are bent over at an inclination to the body of the blank, as indicated in Figs. 11 and 12. When the hook-forming levers are rocked to the horizontal position (indicated in Fig. 10) and have turned one edge of the blank up and the other down, the gage-strips on the levers J J', respectively, strike against horizontal shoulders $k^7$ on the support H and gripper-lever I'. These horizontal shoulders constitute guides for the levers when they are moved inwardly to bend the hooks over the lips on the support and gripper-lever and act to hold the hook-forming levers firmly against the hooks on the blank. After the seam-hooks are thus formed the gripper-levers are operated to release the blank. As the gripper-lever I' is pivoted near its gripping end, when its outer end is drawn downwardly its inner end swings in such an arc that it moves directly away from the seam-hook. The lip on the gripper-lever is therefore moved quickly out of contact with the hook, leaving the blank free to be carried to the body-former by the feed devices. If the gripping end of the gripper-lever were moved upwardly instead of as described, its lip would not clear the hook on the blank and the feeding of the latter would be impaired. After the seam-hooks have been formed on the blank the feed-bars at their next rearward movement carry the hooked blank to the body-forming mechanism comprising a horizontal horn or mandrel and swinging forming-jaws.

The body-forming horn or mandrel (see Figs. 4, 5, and 14) projects rearwardly from the main frame beneath an opening $l$ therein, through which the blanks pass to the horn. The latter is substantially the same shape in cross-section as the body to be formed and consists of a stationary section L and a movable expanding wing or section L', hinged thereto. The stationary section of the horn is secured to the main frame by lateral arms $l'$, which project from opposite sides of the front end of the stationary section and bear against the rear face of the main frame, to which they are secured by bolts or the like $l^2$. The stationary horn-section is provided with a forward extension $l^3$, which projects through an opening in the main frame and provides a bearing for the front end of the axial expanding-pin $l^4$ of the horn. This extension $l^3$ also serves as the means to which the rear end of the stationary central supporting-strip $c$ for the blanks is secured. The movable wing is provided with a transverse screw $l^5$, Fig. 14, which projects through an opening in the stationary part of the horn into the central axial hole thereof, in which the expanding-pin $l^4$ is located. The latter extends forwardly through the extension $l^3$ of the horn, and its inner end is provided with a beveled face adapted to engage the screw $l^5$ to move the hinged section out to expand the horn. By adjusting the screw $l^5$ the expanding movement of the hinged wing can be regulated as required. The expanding-pin is held normally forward or retracted by a spring $l^6$, which is coiled about the expanding-pin in the horn extension between a shoulder thereon and a shoulder on the pin.

M, Figs. 4 and 7, represents supports for supporting the sides of the body-blank when the same has been moved into position over the forming-horn to prevent the sides from dropping and to properly center the blank over the horn. These supports are arranged at opposite sides of the horn and are pivoted on brackets $m$, projecting from the rear side of the main frame. The supports are provided in their inner edges with longitudinal grooves, in which the hooked edges of the blank engage. The outer ends of the pivoted supports M are connected by links $m'$ to levers $m^2$, which are pivoted on the main frame and project rearwardly therefrom. The levers $m^2$ are provided at their rear ends with rollers $m^3$, which bear on the peripheries of cams $m^4$, secured to the crank-shaft G. The form of the cams is such that the pivoted supports are held in the position shown in Fig. 4 with their grooves in position to receive the side edges of the blank when the latter is fed from the edge-forming mechanism, and the inner edges of the pivoted supports are lowered just before the body-forming jaws engage the blank and bend it around the horn. The supports are moved downwardly somewhat in advance of the downward movement of the forming-jaws, thus preventing the side of the blank from being bent upwardly.

$m^5$ represents squaring-fingers against which the blanks are moved by the feed devices and which act to accurately position the blank beneath the forming-horn. The fingers are pivoted at their upper ends to plates $m^6$, adjustably secured to the brackets $m$, and their lower ends connected to springs $m^7$, which are connected to the front portions of the brackets. The springs yieldingly hold the squaring-fingers against adjustable stop-screws $m^8$, passing through lugs on the plates $m^6$. When the blanks strike the squaring-fingers, they yield and when returned by their springs move the blank into the true or correct position relative to the horn.

N represents a vertically-reciprocating clamp adapted to bear on the central portion of the blank to hold the latter in place on the upper side of the horn while the body is being formed and brace the horn while under the impulse of the seam-closing hammer. The clamp has a recess in its bottom, in which is located a block $n$, which is held down against the horn by a spring. The front end of the block is beveled or rounded off, so that the blank can enter between the same and the horn. This block constitutes a yielding presser for holding the blank on the horn while the clamp is raised. The clamp is slidably mounted in a bracket $n'$, of substantially inverted-U shape, which is secured at its forward end by bolts to the main frame. The clamp-slide is provided with a recess or pocket in one side, in which are journaled lower bearing-roller $n^2$ and an upper roller $n^3$.

$n^4$ represents a rocking cam which is arranged between the upper and lower rollers of the slide and is journaled at its opposite ends in holes in the vertical separated portions of the bracket $n'$. This rocking cam is provided with two substantially semicylindrical faces of different radius connected by inclined portions. When the cam is rocked in one direction, one of said inclined faces engages the lower rollers and moves the slide downwardly to clamp the blank on the horn. When the cam is rocked in the opposite direction, the other inclined face engages the upper roller and lifts the clamp. The rocking cam (see Fig. 4) is provided with an arm $n^5$, which is connected by a link $n^6$ to the inner arm of a lever $o$, which is pivoted on the rear side of the main frame and has its outer arm connected by a link $o'$ to a slide $o^2$, which is mounted to reciprocate in vertical ways $o^3$ on the main frame. The slide $o^2$ is provided with a stud or roller at its lower end, which engages in a cam-groove in one face of a cam-disk $o^4$, secured to the crank-shaft G. The cam-groove in the disk $o^4$ is so shaped that the rocking cam is operated to lower the clamp and hold it down on the blank while the latter is being formed around the horn and to raise the clamp and hold it up while the blank is being moved from the horn and another blank substituted or placed on the horn.

In the construction just described the clamp N is positively raised and lowered by the rocking cam. It is not, however, necessary to positively raise the clamp, and the upper roller $n^3$, on which the cam acts, may be omitted, in which event the clamp will be held against the horn by gravity and will arrest the blank in the proper position. In this case the function of the spring-pressed block will be accompanied by the clamp proper and the block can be omitted. The rocking cam operates in the same manner to move the clamp toward the horn and grip the blank.

P P' represent the body-forming jaws, the inner faces of which are shaped to embrace the horn and press the blank closely around the same. The jaws are pivoted at their inner ends above the horn on shafts or pins $p$, supported at opposite ends in the bracket $n'$ and a bearing-piece $p'$, secured to the main frame of the machine. (See Fig. 6.)

$p^2$ represents a sliding cross-head, which is mounted to reciprocate in vertical ways $p^3$, provided on the rear side of the main frame above the bracket $n'$, and is operated by the lever $o$, to which it is connected by a link. The cross-head is connected to the jaw P by a link $p^4$ and to the jaw P' by a link $p^5$. The link $p^4$ is preferably formed of a flat strip of spring metal and is somewhat longer than the link $p^5$, so that when the head is moved downwardly the jaw P is moved slightly in advance of the other jaw to carry the side of the body-blank beneath the jaw P around the horn in advance of the other side of the blank for the purpose of properly overlapping the seam-hooks. When the jaw P is arrested by the horn, the yielding link permits the head to continue its downward movement to close the other jaw against the horn. The link $p^5$, connecting the jaw P' with the head, is preferably made adjustable in length by an ordinary turnbuckle. When the jaws are thus closed around the horn, the body-blank encircles the same, with the hooked ends overlapped and ready to be interlocked by the expanding of the horn.

The expanding-pin is operated from the vertically-reciprocating slide Q, which carries the hammer $q$ for closing the seam of the can-body. The hammer-slide is mounted in vertical ways provided on the rear side of the main frame and is connected by an adjustable link or pitman $q'$ to a crank $q^2$ on the crank-shaft G. In the construction shown in Figs. 1 and 5 the hammer-slide is provided with an arm or bracket $q^3$, which projects forwardly through an opening in the main frame and carries a vertical rod $q^4$, the upper end of which is beveled and adapted when the slide is raised to engage a beveled face on the forward end of the expanding-pin. When the beveled faces on the expanding-pin and rod are engaged, the expanding-pin is forced inwardly or rearwardly to expand the horn to interlock the seam-hooks. This is done before the hammer-slide has been raised sufficiently far to cause the hammer to strike and close the seam. The operating-rod $q^4$ for the expanding-pin is adjustably connected with the hammer-slide to properly time the contact of the same with the expanding-pin, and for this purpose the rod is screw-threaded and passes through a hole in the end of the arm $q^3$ and through clamping-nuts $q^5$ on opposite sides of the arm. Various other ways of operating the expanding-pin from the hammer-slide will readily suggest themselves.

Figs. 17, 18, and 19 show means of different construction for operating the expanding-pin. In the construction shown in Fig. 17 the hammer-slide is provided with a projection $q^6$, having an inclined face which engages an inclined face on a lever $q^7$, pivoted on the frame extension and bearing at its upper end against the outer end of the expanding-pin. In the construction shown in Fig. 18 the arm on the hammer-slide is connected by a link $q^8$ with a bell-crank lever $q^9$, pivoted on the frame extension and connected to the expanding-pin. In the construction shown in Fig. 19 the lever $q^{12}$ is pivoted on a lug on the frame extension, with its upper end engaging between collars or flanges on the outer end of the expanding-pin. The lower end of the lever is provided with a roller which engages in a cam-slot in the projection $q^{13}$ on the hammer-slide. In this construction the spring in the horn for projecting the expanding-pin is not necessary. If preferred, a spring could be employed outside of the horn in connection with the operating-lever for the expanding-pin to replace the spring in the horn. This outside arrangement of the spring is desirable in some respects, as it sometimes happens that the expanding-pin will stick when moved inward and the small spring in the horn is not strong enough to return the pin, while the outside spring can be made of any necessary strength.

While the expanding-pin is held inward and the horn expanded the hammer $q$ strikes the interlocked hooks, firmly pressing or closing the seam. When the hammer strikes the seam, the impulse of the blow is transmitted, through the horn, to the clamp N, which bears thereon, and through the rollers $n^2$ of the clamp and rocking cam $n^4$ to the bracket $n'$. The relative arrangement of the hammer-slide and operating crank and pitman therefor is such that the direction of the thrust on the horn is practically in a straight line joining the crank and a shoulder or abutment $q^{10}$, Fig. 5, on the main frame above the bracket $n'$. The bracket is provided with screws $q^{11}$, which abut against the shoulder. The described construction holds the horn very rigidly, and the horn cannot give at its rear end and lessen the effect of the blow of the hammer on the rear portions of the body-seam.

R represents a horn extension or support on which the bodies after they have been formed are supported and moved along rearwardly to the fluxing, soldering, burnishing, and cooling devices. The horn extension is of skeleton form, consisting of longitudinal separated rods or strips secured at their forward ends to the reduced rear end of the horn and to circular blocks or rings $r$, arranged at suitable intervals along the horn extension. The rear end of the horn extension is provided with a roller or wheel $r'$, which bears on a roller or wheel $r^2$, journaled in bearings on the upper portion of a supporting-frame $r^3$ for the horn extension. The rollers while preventing the sagging of the rear end of the horn extension, allow the can-bodies to pass rearwardly off of the extension between said rollers.

The conveying mechanism for removing the can-bodies from the forming-horn and conveying them along the horn extension is constructed as follows: S, Figs. 14, 15, and 16, represents stationary guide-rods which are mounted at opposite sides of the horn extension in suitable brackets $s$, rising from the frame. T represents two longitudinal reciprocating conveyer-bars which are arranged on opposite sides of the horn extension, between the same and the guide-rods. The conveyer-bars are supported by brackets $t$, which slide on and project inwardly from the guide-rods S, and the conveyer-bars are preferably connected by curved yokes $t'$. The conveyer-bars are reciprocated forwardly and rearwardly on the guide-rods by suitable means. For instance, the front bearing-brackets for the conveyer-bars (see Figs. 1 and 15) are provided with depending arms which are connected by links $t^2$ with the upper end of the rock-arm $t^3$, mounted on the rock-shaft $g^7$, Fig. 3. U, Fig. 14, represents two stripping-fingers which are pivoted on the forward ends of the conveyer-bars and project forwardly therefrom, having at their front ends inwardly-projecting hooks $u$. The pivoted fingers are adapted to enter longitudinal grooves $u'$, formed in the body-forming jaws and which when the jaws encircle the forming-horn are positioned at opposite sides of the horn in the horizontal plane of the pivoted stripping-fingers. When the conveyer-bars are moved forwardly, the front ends of the stripping-fingers, which are beveled or tapered, enter the grooves $u'$ in the forming-jaws at the sides of the can-body. The stripping-fingers are pressed toward the horn by springs $u^2$ of any suitable form secured to the conveyer-bars and bearing against the stripping-fingers. When the stripping-fingers reach the limit of their forward movement, the hooks $u$ on their front ends are caused by the springs $u^2$ to engage the front end of the can-body, and when the conveyer-bars are moved rearwardly the body is stripped or pulled rearwardly off of the horn and onto the horn extension by the stripping-fingers. The horn is provided at opposite sides with longitudinal grooves in which the hooks of the stripping-fingers move in removing the can-body. Besides the pivoted stripping-fingers each conveyer-bar is provided with a series of conveyer-fingers V, which are pivoted at their forward ends on the conveyer-bars and have their rear ends pressed toward the horn extension by springs $v$ of suitable form secured to the conveyer-bars and bearing against the conveyer-fingers. The free ends of the conveyer-fingers travel in grooves formed in the side bars of the horn extension. After a body has been stripped from the horn it is left on the horn extension, and at the next forward movement of the conveyer-bars the foremost conveyer-fingers ride over the can-body and spring inwardly, engaging the forward end thereof, so that at the next rearward movement of the conveyer-bars the body is carried a step rearward. The body is thus taken hold of and moved rearwardly on the horn extension step by step by the successive pairs of conveyer-fingers until the finished body is discharged from the rear end of the horn extension.

I claim as my invention—

1. The combination of supports for the side edges of the sheet-metal blank, gripper-levers coöperating with said supports to hold the blank, pivoted hook-forming levers, slides mounted directly below said hook-forming levers and upon which said hook-forming levers are pivoted intermediate of their ends, guides in which said slides are movable in straight lines toward said supports, means for rocking said hook-forming levers to bend the edges of the blank, and means for moving said slides toward the blank to bend the edges of the blank over at an inclination to the body of the blank, substantially as set forth.

2. The combination of supports for the side edges of the blank, gripper-levers coöperating with said supports to hold the blank, one of said supports and one of said gripper-levers having a forming-lip, pivoted hook-forming levers, means for rocking said hook-forming levers to bend the edges of said blank, means for moving said hook-forming levers toward the blank to press the hooks against said lips on the support and gripper-lever, and guide-shoulders on said support and said gripper-lever for guiding the hook-forming levers in their movement toward the blank, substantially as set forth.

3. The combination of an upright frame, devices for gripping the sheet-metal blank, devices for forming seam-hooks at opposite edges of the blank, a shaft journaled at one side of the lower portion of said frame, operative connections between said shaft and said devices, an expansible forming-horn, means for expanding said horn, a clamp, body-forming jaws, a shaft journaled at the other side of the lower portion of said frame, and operative connections between said shaft and said horn-expanding means, clamp and forming-jaws, substantially as set forth.

4. The combination of supports for the side edges of the blank, gripper-levers coöperating with said supports to hold the blank, one of said gripper-levers being pivoted intermediate of its ends and adjacent to the gripping end, said gripper-lever having a hook-forming lip at its gripping end, operating means for said gripper-lever connected to the other end thereof, and means for pressing the hooked edge of the blank against said lip, substantially as set forth.

5. The combination of a frame, a forming-horn secured at one end to said frame and projecting therefrom, a bracket secured to said frame, a sliding clamp movable toward and from said horn, a cam journaled in said bracket and engaging parts carried by said sliding clamp to move the same into engagement with said horn, a hammer, and means for moving said hammer toward and from the horn, the impulse of said hammer being transmitted to the supporting-frame through said clamp, operating-cam and supporting-bracket, substantially as set forth.

6. The combination of a frame, a forming-horn secured at one end of said frame and projecting therefrom, a bracket arranged above the horn and secured at one end to said frame, one or more parts on said bracket engaging beneath an abutment on said frame, a sliding clamp movable in said bracket toward and from said horn, a cam journaled in said bracket and engaging parts carried by said sliding clamp to operate the same, a hammer mounted below said horn, a shaft below said hammer, and a pitman connecting said hammer with said shaft, the position of the parts being such that when the hammer is moved into engagement with the can-body on the horn the impulse of the hammer is transmitted in substantially a straight line joining said shaft and said abutment on the frame, substantially as set forth.

7. The combination of hook-forming devices, a body-forming horn, mechanism for conveying the blank from said hook-forming devices to said horn, pivoted supports at opposite sides of said horn for the hooked edges of the blank, body-forming devices for forming the blank around the horn, and cams operatively connected to said pivoted supports for positively moving said supports for the edges of the blank to release the latter prior to its being engaged by said body-forming devices, substantially as set forth.

8. The combination with means for supporting the side edges of the blank, of independently-pivoted squaring-fingers against which the blank is fed, independently-adjustable stops for said fingers, and springs for yieldingly holding said squaring-fingers against said stops, substantially as set forth.

9. The combination of a horn, pivoted jaws for forming the body around the horn, a sliding head, means for operating the same, a rigid link connecting said head with one of said body-forming jaws, and a strip of spring metal connecting said head with the other of said body-forming jaws, said spring-strip being longer than the link connecting the other jaw with the sliding head, substantially as set forth.

10. The combination of an expansible body-forming horn, a hammer movable toward said horn to close the can-body seam, an expanding-pin for said horn, and means operated by said hammer for moving said expanding-pin to expand the horn, substantially as set forth.

11. The combination of an expansible body-forming horn, a hammer movable toward said horn to close the can-body seam, an expanding-pin for said horn movable longitudinally therein, and operative connections between said hammer and said expanding-pin to move the latter to expand said horn, substantially as set forth.

12. The combination of an expansible body-forming horn, a hammer movable toward said horn to close the can-body seam, an expanding-pin for said horn, means operated by said hammer for moving said expanding-pin to expand the horn, and a spring for returning the expanding-pin, substantially as set forth.

13. The combination of an expansible body-forming horn, a hammer movable toward said horn to close the can-body seam, an arm carried by said hammer, and a rod carried by said arm and provided with an inclined face adapted to engage an inclined face on said expanding-pin to move the latter to expand the horn, substantially as set forth.

14. The combination of a can-body-forming horn, pivoted forming-jaws for bending the blank around said horn, said forming-jaws having longitudinal grooves on their inner faces, stripping-fingers arranged in rear of said horn and adapted to enter said grooves in the forming-jaws to grasp the can-body, and means for reciprocating said stripping-fingers to grasp and move the can-body off of said horn, substantially as set forth.

15. The combination of a body-forming horn, body-forming jaws, means for moving the same toward the horn to form the body, said jaws having longitudinal grooves in their inner faces, reciprocating conveyer-bars arranged in rear of said horn, stripping-fingers pivoted on said conveyer-bars and adapted to extend forwardly into said grooves in the forming-jaws, hooks on the ends of said fingers for engaging the can-body on the horn, springs for pressing the fingers toward the horn, and means for moving said conveyer-bars, substantially as set forth.

16. The combination of means for holding the blank, a hook-forming lip, a hook-bending tool, movable mechanism for moving said hook-bending tool toward said hook-forming lip and also in a direction at an angle to its direction of movement toward said hook-forming lip to bend the edge of the blank on said lip, and a stationary guide which is engaged by said hook-bending tool to hold the latter from movement away from said lip in bending the edge of the blank, substantially as set forth.

17. The combination of a frame, means for holding the blank, devices for bending the opposite edges of the blank, supports for said devices, bell-crank levers for said supports, a cam-shaft journaled on said frame below said bending devices and provided with operating-cams for said supports and bending devices, and adjustable upright operating-links connecting said cams with said bending devices and said bell-crank levers for said supports, and having substantially vertical movements in operating said parts, substantially as set forth.

Witness my hand this 8th day of October, 1902.

OLIVER J. JOHNSON.

Witnesses:
 JNO. J. BONNER,
 C. M. BENTLEY.